United States Patent Office 3,299,188
Patented Jan. 17, 1967

3,299,188
PHOSPHORIC, PHOSPHONIC, PHOSPHINIC OR THIONOPHOSPHORIC, -PHOSPHONIC, -PHOSPHINIC ACID ESTERS
Hans-Gerd Schicke, Wuppertal-Elberfeld, Germany, assignor to Farbenfabriken Bayer Aktiengesellschaft, Leverkusen, Germany, a German corporation
No Drawing. Filed June 23, 1964, Ser. No. 377,380
Claims priority, application Germany, June 24, 1963, F 40,053
15 Claims. (Cl. 260—940)

The present invention relates to and has as its objects new and useful, pesticidally, especially insecticidally and acaricidally active phosphorus containing compounds as well as processes for the production thereof. More specifically this invention is concerned with phosphoric, phosphonic, phosphinic or thionophosphoric, -phosphonic, -phosphinic acid esters of the general formula

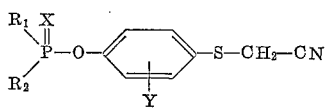

wherein $R_1$ and $R_2$ stand for the same or different lower alkyl, alkoxy, N-alkylamino or N,N-dialkylamino groups, $R_1$ may also represent an aryl, preferably phenyl radical while X is an oxygen or sulphur atom and Y denotes hydrogen or halogen atoms, lower alkyl, alkoxy or nitro groups.

In accordance with the present invention it has been found that compounds of the above structure are obtained in a smoothly proceeding reaction as well as with excellent yields if phosphoric, phosphonic, phosphinic or thionophosphoric, -phosphonic-, -phosphinic acid halides of the general formula

are reacted with 4-cyanomethylmercapto phenols of the formula

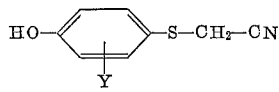

The course of the process according to the present invention may be represented by the following reaction scheme:

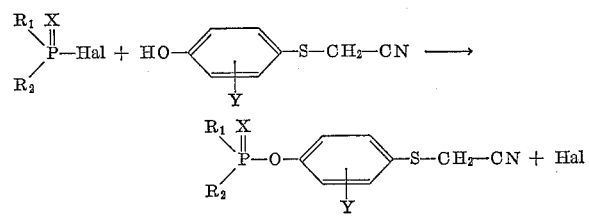

In the last mentioned formulae the symbols $R_1$, $R_2$, X and Y have the meaning given above, while Hal stands for a halogen atom.

The reaction according to the present invention is preferably carried out in the presence of acid-binding agents. Alkali metal carbonates or alcoholates have proved especially suitable for this purpose.

Furthermore, it is advisable to carry out the reaction in an inert organic solvent and at a slightly or moderately elevated temperature (40 to 100° C., preferably 50 to 70° C.) and after combination with the starting component, also to stir the reaction mixture for some time (1 to 3 hours) while heating it to the temperature indicated above. Examples of solvents which may be considered primarily are optionally chlorinated hydrocarbons, such as methylene chloride, benzene, toluene and low boiling aliphatic ketones or nitriles, for examples acetone, methyl ethyl ketone, methylisopropyl ketone and methylisobutyl ketone, furthermore aceto- and propionitrile.

The 4-cyanomethylmercapto phenols required as starting materials for the process according to the invention have hitherto not been described in the literature. They can, however, be prepared by methods known in principle from the corresponding 4-mercapto phenols, which may be further substituted in the nucleus, and chloroaceto nitrile according to the following equation:

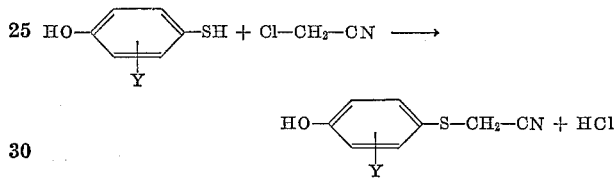

The reaction is preferably carried out at a slightly to moderately elevated temperature (30 to 50° C.) and in the presence of acid-binding agents and organic solvents, advantageously an alcoholic sodium metal alcoholate solution. The intermediate products are generally obtained in the form of colourless crystalline substances which can readily be purified by recrystallisation from customary solvents and then possess a sharp melting point.

The (thiono)phosphoric, -phosphonic and phosphinic acid esters obtainable according to the present process are, in part, likewise solid products; some, however, are clear, colourless or pale yellow to brown coloured oils which cannot be distilled without decomposition, even under strongly reduced pressure. The compounds are distinguished by outstanding biological properties.

In German patent specifications Nos. 1,101,406 and 1,116,656 0,0-dialkylthionophosphoric acid-0-(alkylmercaptophenyl)-phosphoric acid esters of the general formula

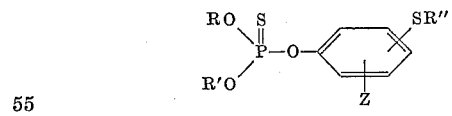

have already been described, wherein R, R' and R" stand for lower alkyl radicals, and Z represents hydrogen or halogen atoms, or alkyl, aryl or nitro groups.

In comparison with these known compounds of analogous composition which have been proposed for the same purpose, the products of the present process, surprisingly, possess a considerably better pesticidal, especially insecticidal activity, particularly a much increased effect against ticks. This unexpected, technically valuable superiority of the (thiono) phosphoric, phosphonic, phosphinic acid esters according to the present invention becomes evident from the experimental data summarized in the following table:

| Compound (constitution) | Insecticidal activity when used against ticks | |
|---|---|---|
| | Active agent concentr. in percent | Destruction of pests in percent |
| $C_2H_5O$ \ $P$—$O$—⟨ ⟩—$S$—$CH_2$—$CN$ / $C_2H_5O$ (According to invention, Example 1) with S double bond on P | 0.0005 | 75 |
| $CH_3O$ \ $P$—$O$—⟨ ⟩—$S$—$CH_2$—$CN$ / $CH_3O$ (According to invention, Example 2/Tab.) with S double bond on P | 0.05 | 90 |
| $C_2H_5O$ \ $P$—$O$—⟨ Cl ⟩—$S$—$CH_2$—$CN$ / $C_2H_5O$ (According to invention, Example 3) with S double bond on P | 0.00025 | 100 |
| $CH_3O$ \ $P$—$O$—⟨ Cl ⟩—$S$—$CH_2$—$CN$ / $CH_3O$ (According to invention, Example 4/Tab.) with S double bond on P | 0.0025 | 40 |
| $CH_3O$ \ $P$—$O$—⟨ Cl ⟩—$S$—$CH_2$ / $CH_3O$ (Known from German patent specification 1,116,656, Example 2/Tab.) with S double bond on P | 0.01 | 90 |
| $C_2H_5O$ \ $P$—$O$—⟨ $CH_3$ ⟩—$S$—$CH_2$ / $C_2H_5O$ (Known from German patent specification 1,116,656, Example 2/Tab.) with S double bond on P | 0.001 | 20 |
| $CH_3O$ \ $S$—$O$—⟨ $CH_3$ ⟩—$S$—$CH_3$ / $CH_3O$ (Known from German patent specification 1,116,656, Example 1). with S double bond on S | 0.1 | 0 |

The tests have been carried out as follows:

Aqueous dilutions of these compounds have been prepared by admixing them with the same amount of dimethyl formamide as an auxiliary solvent adding thereto 20% by weight referred to active ingredient of a commercial emulsifier consisting of a benzyl hydroxy polyglycol ether containing about 10 to 15 glycol residues, and diluting at least this premixture with water to the desired concentration indicated in the preceding paragraphs.

Female ticks of the type *Boophilus microplus* each are placed into mull bags which are brought into a solution prepared as described above while moving them continuously. After 1 minute the mull bags are taken off the active solutions and put into glass dishes in which filter paper is placed. The ticks are taken off the mull bags and placed upon dry filter paper. Evaluation occurred after 24 hours, 48, 72 and eventually 96 or 120 hours. On account of their outstanding insecticidal properties the inventive products are applied as pest control agents, especially in plant protection.

The new compounds of the present invention very effectively kill insects like aphids, bugs, spider mites, caterpillars, beetles, cockroaches, flies, termites, mosquitoes. They distinguish themselves especially by a good contact-insecticidal activity and mostly also by a strong systemic and good ovicidal action. At the same time they have an activity on eating insects such as caterpillars. Most surprisingly they are of remarkable low toxicity against mammals. They may be used in the same manner as other known phosphoric insecticides, i.e., in a concentration from about 0.00001% to about 1%, diluted or extended with suitable sold or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, or fertilizers, etc.

The following examples are given for the purpose of illustrating the invention:

Example 1

(a) 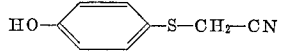

252 g. (2 mol) of 4-mercaptophenol are dissolved in 300 cc. of methanol, 2 mol of sodium methylate dissolved in 500 cc. of methanol are added to this solution at 30–40° C. and the mixture is then stirred for 15 minutes. 151 g. (2 mol) of chloroacetonitrile are then added dropwise to the reaction mixture. Care is taken that the temperature of the mixture is maintained at 30–40° C. by slight external cooling. The reaction mixture is then heated at 50° C. for one hour, acidified with some drops of hydrochloric acid and finally poured into 2 litres of water. The 4-cyanomethyl-mercapto phenol immediately precipitates in crystalline form. The crystal slurry is filtered off with suction, the crystals are dried and recrystallised from benzene. The product then melts at 106 to 107° C. The yield amounts to 275 g. (83.4% of the theoretical).

*Analysis.*—Calculated for a molecular weight of 165: N, 8.49%; S, 19.4%. Found: N, 8.41%; S, 19.33%.

(b) 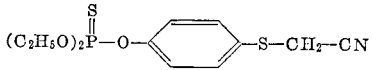

82.5 g. (0.5 mol) of 4-cyanomethylmercapto phenol are dissolved in 250 cc. of acetonitrile, and 70 g. of dry powdered potassium carbonate are added to this solution. The mixture is then stirred at 50–60° C. for 15 minutes, and 94.3 g. of 0,0-diethyl-thiono phosphoric acid chloride are added dropwise at this temperature, the reaction mixture is stirred for a further 2 hours at 50–60° C. and, after cooling to 20° C., poured into 1000 cc. of water. The separated oil is taken up in methylene chloride and the methylene chloride solution dried over sodium sulphate. After distilling off the solvent, 151 g. (97% of the theoretical) of the 0,0-diethylthiono phosphoric acid -0-(4-cyanomethyl-mercapto-phenyl) ester are obtained in form of a yellow oil with a refractive index of $n_D^{22}$: 1.5470.

*Analysis.*—Calculated for molecular weight of 317: P, 9.79%; S, 20.2%; N, 4.42%. Found: P, 10.11%; S, 19.90%; N, 4.47%.

Example 2

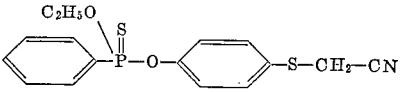

To a solution of 49.5 g. (0.3 mol) of 4-cyanomethyl-mercapto phenol in 250 cc. of acetonitrile 45 g. of dry powdered potassium carbonate are added and the mixture is then stirred for 15 minutes at 50–60° C. 66.2 g. of phenyl-0-ethylthiono phosphonic acid chloride are added dropwise at the stated temperature to the reaction mixture which is stirred for a further two hours at 50–60° C., and subsequently cooled to 20° C. and then poured into 1000 cc. of water. The separated oil is taken up in methylene chloride, and the aqueous layer is extracted twice with 300 cc. of methylene chloride each time. The combined organic phases are dried over sodium sulphate. After distilling off the solvent, the phenyl-0-ethylthiono phosphonic acid -O-(4-cyanomethyl-mercapto-phenyl) ester is obtained in form of a yellow oil. The yield amounts to 87 g. (92% of the theoretical).

Analysis.—Calculated for a molecular weight of 349: P, 8.89%; S, 18.35%; N, 4.02%. Found: P, 8.54%; S, 17.85%; N, 4.57%.

In an analogous manner to that described in the preceding examples the following compounds can be prepared:

A solution of 59.8 g. (0.3 mol) of 3-chloro-4-cyanomethyl-mercapto phenol in 250 cc. of acetonitrile is first mixed with 45 g. of dry powdered potassium carbonate and, after stirring for 15 minutes at 60° C., treated dropwise with 56.5 g. of 0,0-diethylthiono-phosphoric acid chloride. The mixture is the allowed to react for a further two hours at 60–70° C. and then worked up as described in Examples 1 and 2. 89 g. (76.5% of the theoretical) of the 0,0-diethyl-thiono phosphoric acid-0-(3-chloro-4-cyanomethyl-mercapto-phenyl) ester are obtained in the form of a clear, pale brown oil with the refractive index $n_D^{23}$: 1.5567.

Analysis.—Calculated for molecular weight of 351.5: P, 8.82%; S, 18.2%; Cl, 10.1%; N, 3.92%. Found: P, 8.69%; S, 17.62%; Cl, 10.23%; S, 3.93%.

| Constitution | Yield [percent of the theoretical] | Physical properties |
|---|---|---|
| $(CH_3O)_2\overset{S}{\overset{\|}{P}}-O-\langle\rangle-S-CH_2-CN$ | 95 | $n_D^{24}$: 1.5596. |
| $(C_2H_5O)_2\overset{O}{\overset{\|}{P}}-O-\langle\rangle-S-CH_2-CN$ | 96 | $n_D^{24}$: 1.5196. |
| $\underset{CH_3}{\overset{C_2H_5O}{\diagdown}}\overset{S}{\underset{\|}{P}}-O-\langle\rangle-S-CH_2-CN$ | 87 | $n_D^{24}$: 1.5719. |
| $\underset{C_2H_5}{\overset{C_2H_5O}{\diagdown}}\overset{S}{\underset{\|}{P}}-O-\langle\rangle-S-CH_2-CN$ | 92 | $n_D^{24}$: 1.5619. |
| $(CH_3)_2\overset{S}{\overset{\|}{P}}-O-\langle\rangle-S-CH_2-CN$ | 86 | Fp.: 78 to 80° C. |
| $\underset{(CH_3)_2N}{\overset{(CH_3)_2N}{\diagdown}}\overset{S}{\underset{\|}{P}}-O-\langle\rangle-S-CH_2-CN$ | 94 | $n_D^{23}$: 1.5450. |
| $\underset{C_2H_5O}{\overset{(CH_3)_2N}{\diagdown}}\overset{S}{\underset{\|}{P}}-O-\langle\rangle-S-CH_2-CN$ | 82 | $n_D^{23}$: 1.5650. |

Example 3

(a) 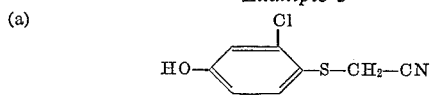

80.3 g. (5 mol) of 3-chlor-4-mercapto-phenol are dissolved in 250 cc. of methanol, 0.5 mol of sodium methylate, dissolved in 125 cc. of methanol, are added to this solution at 30 to 40° C. and the reaction mixture is subsequently stirred for 15 minutes at the stated temperature. The mixture is then treated at 30–40° C. with 38 g. of chloroacetonitrile, stirred for a further hour at 50° C., cooled to 20° C. and acidified with some drops of hydrochloric acid. The mixture is finally poured into water and the separated precipitate is filtered off with suction. After recrystallisation from benzene the 3-chloro-4-cyanomethyl-mercapto phenol has a melting point of 111 to 112° C. The yield amounts to 77 g. (77% of the theoretical).

(b) 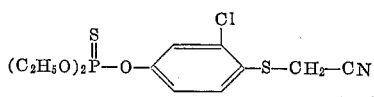

Example 4

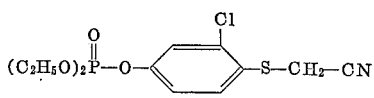

39.9 g. (0.2 mol) of 3-chloro-4-cyanomethyl-mercapto phenol are dissolved in 250 cc. of acetonitrile, this solution is treated with 30 g. of dry powdered potassium carbonate and subsequently stirred for another 15 minutes at 60° C. 34.5 g. of 0,0-diethyl phosphoric acid chloride are then added dropwise to the reaction mixture at 60–70° C. The latter is stirred for another two hours, then cooled to 20° C., worked up as described in Example 3(b), whereupon 59.5 g. (88.6% of the theoretical) of the 0,0-diethyl-phosphoric acid-0-(3-chloro-4-cyanomethyl-mercaptophenyl) ester are obtained in the form of a pale brown oil with refractive index $n_D^{24}$: 1.5336.

Analysis.—Calculated for molecular weight of 335.5:

P, 9.3%; S, 9.59%; Cl, 10.63%; N, 4.2%. Found: P, 9.27%; S, 9.84%; Cl, 10.81%; N, 3.81%.

Under analogous reaction conditions the following compounds can be produced:

crystallised from benzene. 68 g. (76% of the theoretical) of 3-methyl-4-cyanomethyl-mercapto phenol are obtained in the form of colourless crystals of melting point 76 to 77° C.

| Constitution | Yield [percent of the theoretical] | Physical properties |
|---|---|---|
| CH₃O\\P(=S)/CH₃O—O—C₆H₃(Cl)—S—CH₂—CN | 88 | $n_D^{24}$: 1.5729. |
| C₂H₅O\\P(=S)/C₂H₅—O—C₆H₃(Cl)—S—CH₂—CN | 93 | $n_D^{24}$: 1.5724. |
| C₂H₅O\\P(=S)/CH₃—O—C₆H₃(Cl)—S—CH₂—CN | 83 | $n_D^{24}$: 1.5827. |
| C₂H₅O\\P(=S)/C₆H₅—O—C₆H₃(Cl)—S—CH₂—CN | 91 | $n_D^{24}$: 1.6007. |
| CH₃\\P(=S)/CH₃—O—C₆H₃(Cl)—S—CH₂—CN | 91 | M.P.: 39 to 40° C. |

Example 5

(a)

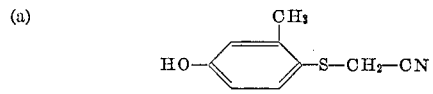

A solution of 70 g. (0.5 mol) of 3-methyl-4-mercapto phenol in 250 cc. of methanol is treated at 30–40° C. with 0.5 mol of sodium methylate, dissolved in 125 cc. of methanol. The mixture is subsequently stirred for 15 minutes and 38 g. of chloroacetonitrile are then added dropwise at 30 to 40° C. The reaction mixture is heated at 50° C. for another hour and, after cooling to room temperature, poured into water. The separated oil is taken up in methylene chloride and the methylene chloride solution dried over sodium sulphate. Finally the solvent is distilled off in vacuum and the residue re- (b)

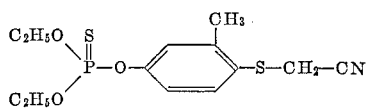

53.7 g. (0.3 mol) of 3-methyl-4-cyanomethyl-mercapto phenol are dissolved in 250 cc. of acetonitrile. To this solution are added 45 g. of dry powdered potassium carbonate, the mixture is then stirred for 15 minutes at 60° C. and 56.5 g. of O,O-diethylthiono phosphoric acid chloride are then added dropwise. The reaction mixture is then stirred for a further 2 hours at 60 to 70° C. and finally worked up as described in the preceding example. The O,O-diethylthiono phosphoric acid-O-(3-methyl-4-cyanomethyl-mercapto-phenyl) ester is obtained in form of a pale brown oil of refractive index $n_D^{23}$:1.5475. The yield amounts to 92 g. (93% of the theoretical).

*Analysis.*—Calculated for molecular weight of 331: P, 9.36%; N, 4.21%. Found: P, 9.63%; N, 4.23%.

In an analogous manner the following compounds can be produced:

| Constitution | Yield [percent of the theoretical] | Physical properties (refractive index) |
|---|---|---|
| CH₃O\\P(=S)/CH₃O—O—C₆H₃(CH₃)—S—CH₂CN | 95 | $n_D^{24}$ 1.5652. |
| C₂H₅O\\P(=O)/C₂H₅O—O—C₆H₃(CH₃)—S—CH₂CN | 86 | $n_D^{24}$ 1.5321. |
| C₂H₅O\\P(=S)/C₂H₅—O—C₆H₃(CH₃)—S—CH₂—CN | 97 | $n_D^{24}$ 1.5674. |

Example 6

The outstanding insecticidal and acaricidal activity of the inventive compounds is to be seen from the following table:

| Compound (constitution) | Pesticidal Activity | | |
|---|---|---|---|
| | Administration against | Active agent concentration in percent | Destruction of pests in percent |
| $(C_2H_5O)_2\overset{S}{\overset{\|}{P}}-O-\phenyl-S-CH_2-CN$ | Spider mites | 0.001 | 100 |
| $\underset{C_2H_5O}{\overset{C_6H_5}{\diagdown}}\overset{S}{\overset{\|}{P}}-O-\phenyl-S-CH_2-CN$ | Caterpillars | 0.1<br>0.01 | 100<br>80 |
| $(CH_3O)_2\overset{S}{\overset{\|}{P}}-O-\phenyl-S-CH_2-CN$ | ...do... | 0.01 | 100 |
| $(C_2H_5O)_2\overset{O}{\overset{\|}{P}}-O-\phenyl-S-CH_2-CN$ | ...do... | 0.01 | 100 |
| $\underset{CH_3}{\overset{C_2H_5O}{\diagdown}}\overset{S}{\overset{\|}{P}}-O-\phenyl-S-CH_2-CN$ | Spider mites | 0.001 | 100 |
| $\underset{C_2H_5}{\overset{C_2H_5O}{\diagdown}}\overset{S}{\overset{\|}{P}}-O-\phenyl-S-CH_2-CN$ | ...do... | 0.001<br>0.0001 | 100<br>40 |
| $(CH_3)_2\overset{S}{\overset{\|}{P}}-O-\phenyl-S-CH_2-CN$ | Aphids | 1.1<br>1.01 | 100<br>80 |
| $\underset{(CH_3)_2N}{\overset{(CH_3)_2N}{\diagdown}}\overset{O}{\overset{\|}{P}}-O-\phenyl-S-CH_2-CN$ | Spider mites | 0.1 | 100 |
| $\underset{C_2H_5O}{\overset{(CH_3)_2N}{\diagdown}}\overset{S}{\overset{\|}{P}}-O-\phenyl-S-CH_2-CN$ | ...do... | 0.1 | 100 |
| $(C_2H_5O)_2\overset{S}{\overset{\|}{P}}-O-\underset{Cl}{\phenyl}-S-CH_2-CN$ | ...do... | 0.01<br>0.01 | 100<br>90 |
| $(C_2H_5O)_2\overset{O}{\overset{\|}{P}}-O-\underset{Cl}{\phenyl}-S-CH_2-CN$ | Caterpillars | 0.01 | 100 |
| $(CH_3O)_2\overset{S}{\overset{\|}{P}}-O-\underset{Cl}{\phenyl}-S-CH_2-CN$ | Aphids | 0.01<br>0.001 | 100<br>60 |
| $\underset{}{\overset{CH_3O}{\diagdown}}\overset{S}{\overset{\|}{P}}-O-\underset{Cl}{\phenyl}-S-CH_2-CN$ | Spider mites | 1.01<br>0.001 | 100<br>50 |
| $\underset{C_2H_5O}{\overset{C_6H_5}{\diagdown}}\overset{S}{\overset{\|}{P}}-O-\underset{Cl}{\phenyl}-S-CH_2-CN$ | Caterpillars | 1.01 | 100 |
| $\underset{C_2H_5O}{\overset{C_6H_5}{\diagdown}}\overset{S}{\overset{\|}{P}}-O-\underset{Cl}{\phenyl}-S-CH_2-CN$ | ...do... | 0.01 | 100 |
| $(_2CH_3)_2\overset{S}{\overset{\|}{P}}-O-\underset{Cl}{\phenyl}-S-CH_2-CN$ | Spider mites | 0.1<br>0.01 | 100<br>40 |

| Compound (constitution) | Pesticidal Activity | | |
|---|---|---|---|
| | Administration against | Active agent concentration in percent | Destruction of pests in percent |
| $(C_2H_5O)_2\overset{S}{\overset{\|}{P}}-O-\underset{}{\underset{}{\bigcirc}}\overset{CH_3}{}-S-CH_2-CN$ | ...do... | 0.01<br>0.001 | 100<br>90 |
| $(CH_3O)_2\overset{S}{\overset{\|}{P}}-O-\underset{}{\underset{}{\bigcirc}}\overset{CH_3}{}-S-CH_2-CN$ | ...do... | 0.01<br>0.001 | 100<br>90 |
| $(C_2H_5O)_2\overset{O}{\overset{\|}{P}}-O-\underset{}{\underset{}{\bigcirc}}\overset{CH_3}{}-S-CH_2-CN$ | ...do... | 0.01 | 100 |
| 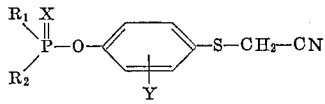—O—⟨⟩—S—CH₂—CN (with CH₃ on ring) | ...do... | 0.001<br>0.0001 | 100<br>80 |

The various tests have been carried out as follows:

(a) Against aphids (species *Doralis fabae*): heavily infested bean plants (*Vicia faba*) have been sprayed drip wet with solutions as prepared above. The effect has been determined after 24 hours by counting the dead pests either on the surface of the soil or still remaining on the plants.

(b) Against spider mites: bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days.

(c) Against caterpillars of the type diamond black moth (*Plutella maculipennis*): white cabbage has been sprayed drip wet with aqueous emulsions as prepared above in a concentration as shown below. Caterpillars (10 each) have been placed on the sprayed leaves of the white cabbage. The living status has been determined after 24 and 48 hours.

What is claimed is:

1. A compound of the formula

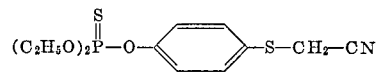

in which $R_1$ stands for a member selected from the group consisting of lower alkyl having up to 4 carbon atoms, lower alkoxy having up to 4 carbon atoms, lower N-alkylamino having up to 4 carbon atoms, lower N,N-dialkylamino having up to 8 carbon atoms and phenyl, $R_2$ stands for a member selected from the group consisting of lower alkyl having up to 4 carbon atoms, lower alkoxy having up to 4 carbon atoms, lower N-alkylamino having up to 4 carbon atoms and lower N,N-dialkylamino having up to 8 carbon atoms and in which X stands for a member selected from the group consisting of oxygen and sulfur and Y stands for a member selected from the group consisting of hydrogen, halogen and lower alkyl having up to 4 carbon atoms.

2. A compound according to claim 1 wherein $R_1$ and $R_2$ stand for lower alkoxy having up to 4 carbon atoms.

3. A compound according to claim 1 wherein $R_1$ stands for lower alkoxy having up to 4 carbon atoms and $R_2$ stands for lower alkyl having up to 4 carbon atoms or phenyl.

4. A compound according to claim 1 wherein $R_1$ and $R_2$ stands for lower alkyl having up to 4 carbon atoms.

5. A compound according to claim 1 wherein $R_1$ and $R_2$ stand for lower N,N-dialkylamino having up to 8 carbon atoms.

6. A compound according to claim 1 wherein $R_1$ stands for lower N,N-dialkylamino having up to 8 carbon atoms and $R_2$ stands for lower alkoxy having up to 4 carbon atoms.

7. The compound of the formula

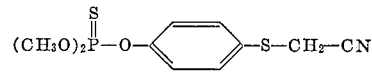

8. The compound of the formula

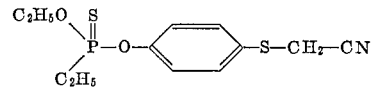

9. The compound of the formula

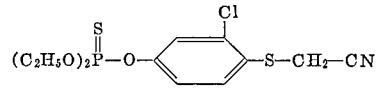

10. The compound of the formula

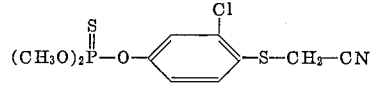

11. The compound of the formula

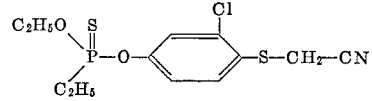

12. The compound of the formula

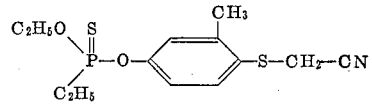

13. The compound of the formula

14. The compound of the formula
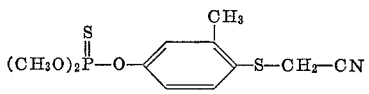
15. The compound of the formula
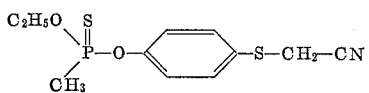
References Cited by the Examiner
UNITED STATES PATENTS
| | | | |
|---|---|---|---|
| 2,754,242 | 7/1956 | Kosolapoff | 167—30 |
| 2,769,743 | 11/1956 | Mattson | 167—30 |
| 3,017,422 | 1/1962 | Thompson | 260—461 |
| 3,079,417 | 2/1963 | Farrar | 260—461 |
CHARLES B. PARKER, *Primary Examiner.*
RICHARD L. RAYMOND, *Assistant Examiner.*